US012755033B2

(12) United States Patent
Sudo

(10) Patent No.: US 12,755,033 B2
(45) **Date of Patent: *Oct. 6, 2026**

(54) SECURE COMPUTATION APPARATUS, SECURE COMPUTATION METHOD, AND PROGRAM

(71) Applicant: NTT, Inc., Tokyo (JP)

(72) Inventor: Hiroki Sudo, Tokyo (JP)

(73) Assignee: NTT, Inc., Tokyo (JP)

( * ) Notice: Subject to any disclaimer, the term of this patent is extended or adjusted under 35 U.S.C. 154(b) by 70 days.

This patent is subject to a terminal disclaimer.

(21) Appl. No.: 18/836,747

(22) PCT Filed: Feb. 16, 2022

(86) PCT No.: PCT/JP2022/006128

§ 371 (c)(1),
(2) Date: Aug. 7, 2024

(87) PCT Pub. No.: WO2023/157118

PCT Pub. Date: Aug. 24, 2023

(65) Prior Publication Data

US 2025/0148095 A1 May 8, 2025

(51) Int. Cl.
*G06F 21/60* (2013.01)
*H04L 9/08* (2006.01)

(52) U.S. Cl.
CPC ............ *G06F 21/602* (2013.01); *H04L 9/085* (2013.01)

(58) Field of Classification Search
None
See application file for complete search history.

(56) References Cited

U.S. PATENT DOCUMENTS 11,966,395 B2 * 4/2024 Shah .................. G06F 16/2456
12,099,506 B2 * 9/2024 Xu ........................ G06F 16/256
(Continued)

FOREIGN PATENT DOCUMENTS

JP 6989006 B2 1/2022

OTHER PUBLICATIONS

Sudo et al. (2022) "Secure SQL Window Functions" 2022 Symposium on Cryptography and Information Security, Osaka, Japan & Online, Jan. 18-21, 2022, Web Abstract: Updated on Jan. 11, 2022, websites: https://www.iwsec.org/scis/2022/program.html, https://www.iwsec.org/scis/2022/_abst/3E3-2.pdf.
(Continued)

*Primary Examiner* — Rupal Dharia
*Assistant Examiner* — Shadi H Kobrosli

(57) ABSTRACT

A secure computation apparatus includes a former half window frame column generation unit configured to generate, with respect to subVector ($\{\vec{g}\}$, s+1, i}, a bit column obtained by an OR operation performed on all bits from the end to each position as $\{w^{f\rightarrow}\}$, a latter half window frame column generation unit configured to generate, with respect to subVector ($\{\vec{g}\}$, i+1, t}, a bit column obtained by an OR operation performed on all bits from the head to each position as $\{w^{l\rightarrow}\}$, a window frame flag column generation unit configured to generate $\{\vec{w}\}$ by combining $\{w^{f\rightarrow}\}$ and $\{w^{l\rightarrow}\}$, an inverted window frame flag column generation unit configured to generate $\{w'^{\rightarrow}\}$ by performing a NOT operation on $\{\vec{w}\}$, a share conversion unit configured to convert $\{w'^{\rightarrow}\}$ into $[[w'^{\rightarrow}]]$, and a product-sum operation unit configured to execute a product-sum operation on subVector ($[[v'^{\rightarrow}]]$, s, t) and $[[w'^{\rightarrow}]]$.

3 Claims, 5 Drawing Sheets

(56) References Cited

U.S. PATENT DOCUMENTS

| | | | |
|---|---|---|---|
| 2021/0191927 A1 | 6/2021 | Ikarashi et al. | |
| 2023/0409579 A1* | 12/2023 | Arnold .............. | G06F 16/24566 |

OTHER PUBLICATIONS

Sudo et al. (2022) "Secure SQL Window Functions" 2022 Symposium on Cryptography and Information Security, Osaka, Japan & Online, Jan. 18-21, 2022, Web Manuscript: pp 1-6, Published on January 12, 2024.

Kikuchi et al. (2020) "Secure cross-sector customer-flow invention," 2020 Symposium on Cryptography and Information Security, Kochi, Japan, Jan. 28-31, 2020, pp. 1-8, 2020.

* cited by examiner

SECURE COMPUTATION APPARATUS, SECURE COMPUTATION METHOD, AND PROGRAM

CROSS-REFERENCE TO RELATED APPLICATIONS

This application is a U.S. 371 Application of International Patent Application No. PCT/JP2022/006128, filed on 16 Feb. 2022, the disclosure of which is hereby incorporated herein by reference in its entirety.

TECHNICAL FIELD

The present invention relates to a secure computation apparatus, a secure computation method, and a program for performing secure computation on a database.

BACKGROUND ART

The window function is a function of grouping records according to key attributes and performing totaling or the like in a "window" having a specified width with each row as a reference. For example, in the case of totaling for one column front and back, the input/output shown in Table 1 is obtained. At this time, it is noted that values of other groups are not summed up.

TABLE 1

| Input | | Output | | |
|---|---|---|---|---|
| Val | Key | sum | Val | Key |
| 1 | A | 3 | 1 | A |
| 2 | B | 6 | 2 | A |
| 3 | A | 5 | 3 | A |
| 1 | C | 3 | 1 | B |
| 2 | A | 6 | 2 | B |
| 3 | B | 5 | 3 | B |
| 1 | B | 3 | 1 | C |
| 2 | C | 3 | 2 | C |

Although there is a group-by function as a function similar to the window function, the group-by function performs aggregation into one value for each group, whereas the window function is different in that a result is output by performing totaling within a window frame for each row. PTL 1 and NPL 1 are conventional techniques related to group-by.

CITATION LIST

Patent Literature

[PTL 1] Japanese Patent No. 6989006

Non Patent Literature

[NPL 1] Ryo Kikuchi, Koki Hamada, Dai Ikarashi, Gen Takahashi, "Secure cross-sector customer-flow invention," In SCIS 2020 (2020 Encryption and Information Security Symposium), pp. 1-8, 2020.

SUMMARY OF INVENTION

Technical Problem

A method of realizing the window function on secure computation has not been reported in any literature. Among SQL functions, the window function needs to perform grouping according to key attributes and then perform totaling within a window frame. However, when realized through secure computation, the problem is to perform computation without looking at the content while encrypting grouping and window frame boundaries.

Accordingly, an object of the present invention is to provide a secure computation apparatus capable of computing a Sum operation of a window function using low-cost arithmetic operations.

Solution to Problem

A secure computation apparatus of the present invention is a secure computation apparatus for performing arithmetic operations while keeping a database including a key column $k^{\rightarrow}$ which is an attribute column and a data column $v^{\rightarrow}$ which is a value column concealed.

A group flag column $g^{\rightarrow}$ represents a vector in which a value becomes 1 at a position where a value of the key column changes, and a value becomes 0 at other positions, a share of a value x according to replicated secret sharing is represented as $\{x\}$, a share of the value x according to Shamir secret sharing is represented as $[x]$, a current row number is represented by i, a window frame start position is represented by s, and a window frame end position is represented by t, the number of rows of the key column and the data column is set to 1, and the current row number i is incremented by one each time all flag column generation processing ends in a range of 0 or more and less than 1.

The secure computation apparatus of the present invention includes a former half window frame flag column generation unit, a latter half window frame flag column generation unit, a window frame flag column generation unit, an inverted window frame flag column generation unit, a share conversion unit, and a product-sum operation unit.

The former half window frame column generation unit generates, with respect to a vector subVector ($\{g^{\rightarrow}$), s+1, i$\}$ obtained by extracting elements from an (s+1)-th element to an i-th element of $\{g^{\rightarrow}$), a bit column obtained by an OR operation performed on all bits from the end to each position as a former half window frame flag column $\{w^{f\rightarrow}\}$.

The latter half window frame column generation unit generates, with respect to a vector subVector ($\{g^{\rightarrow}$), i+1, t$\}$ obtained by extracting elements from an (i+1)-th element to a t-th element of $\{g^{\rightarrow}$), a bit column obtained by an OR operation performed on all bits from the head to each position as a latter half window frame flag column $\{w^{l\rightarrow}\}$.

The window frame flag column generation unit generates a window frame flag column $\{w^{\rightarrow}\}$ by combining the former half window frame flag column $\{w^{f\rightarrow}\}$ from the front side and the latter half window frame flag column $\{w^{l\rightarrow}\}$ from the rear side having $\{0\}$ interposed between the former half window frame flag column $\{w^{f\rightarrow}\}$ and the latter half window frame flag column $\{w^{l\rightarrow}\}$.

The inverted window frame flag column generation unit generates an inverted window frame flag column $\{w'^{\rightarrow}\}$ by performing a NOT operation on the window frame flag column $\{w^{\rightarrow}\}$.

The share conversion unit converts the inverted window frame flag column $\{w'^{\rightarrow}\}$ into an inverted window frame flag column $[[w'^{\rightarrow}]]$.

The product-sum operation unit executes a product-sum operation on subVector ($[[v'^{\rightarrow}]]$, s, t) obtained by extracting elements from s to t of a data column $[[v'^{\rightarrow}]]$ obtained by sorting a data column [[$v^{\rightarrow}$]] in ascending order and the inverted window frame flag column [[$w'^{\rightarrow}$]].

Advantageous Effects of Invention

According to the secure computation apparatus of the present invention, it is possible to compute the Sum operation of the window function using low-cost arithmetic operations.

DESCRIPTION OF EMBODIMENTS

Figure 1:
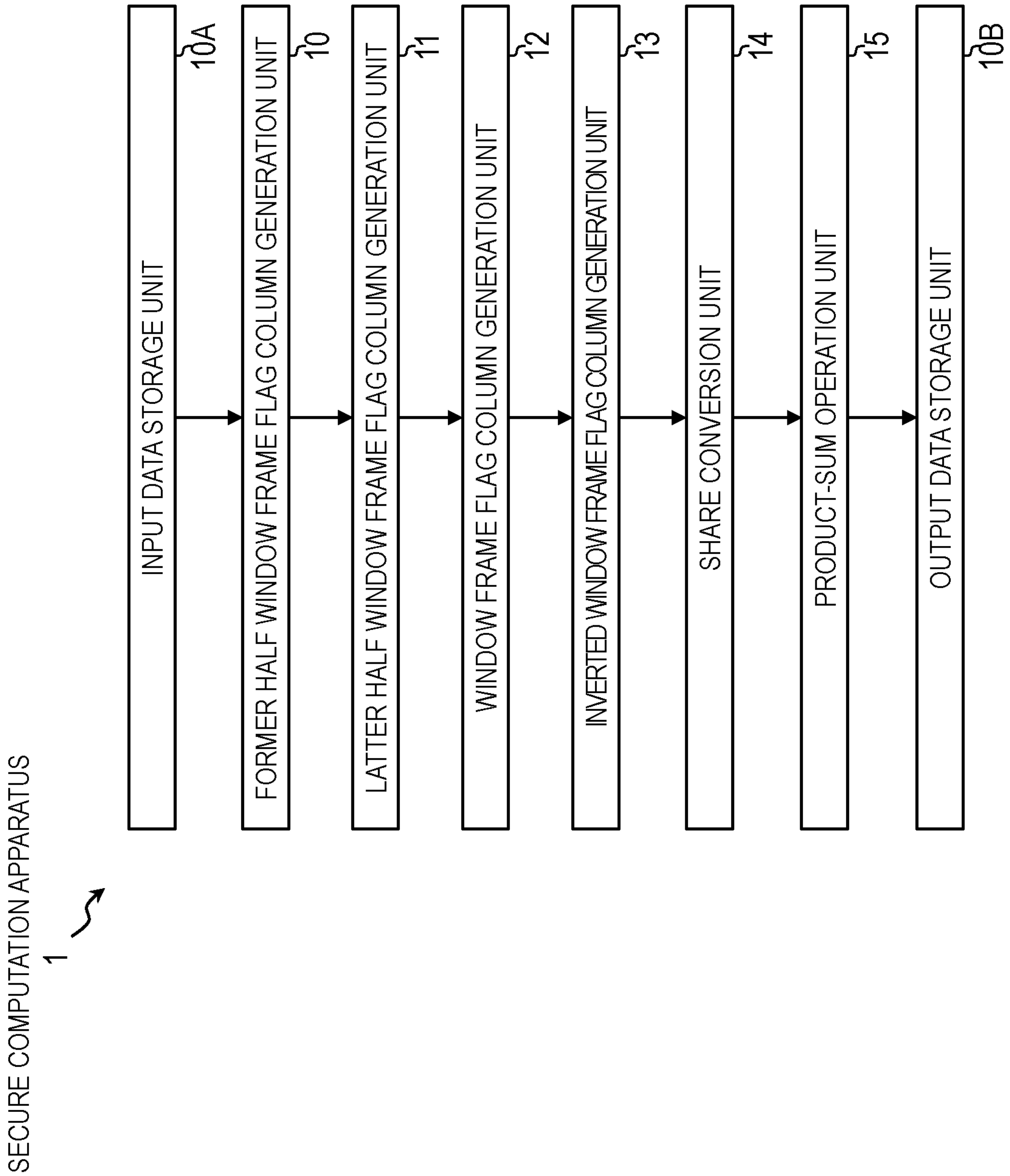
FIG. 1 is a block diagram illustrating a functional configuration of a secure computation apparatus of example 1.

The following describes an example of the present invention in detail. Further, constituent units having the same function are denoted with the same number, and overlapping descriptions thereof are omitted.

<Notation>

The vector is denoted as $v^{\rightarrow}$. An i-th element of the vector is represented as $v_i^{\rightarrow}$. $v^{\rightarrow}|u^{\rightarrow}$ represents combination of $u^{\rightarrow}$ with the end of the vector $v^{\rightarrow}$. $\sigma(v^{\rightarrow})$ represents a vector obtained by substituting vector $v^{\rightarrow}$ with $\sigma$.

Further, an operation of extracting vector v'→ from i-th to j-th elements of vector $v^{\rightarrow}$ is represented as $v'^{\rightarrow}\leftarrow$ subVector ($v^{\rightarrow}$, i, j).

c←max(a,b) means that the larger one of values of plaintext a and b is output through computation in plaintext. c←min(a,b) means that the smaller one of values of plaintext a and b is output through computation in plaintext.

<Secret Sharing>

Secret sharing is an encryption method for dividing data into a plurality of values and distributing the same to a plurality of parties. A secure computation apparatus of the following example encrypts data according to (k, n) threshold value secret sharing. (k, n) threshold value secret sharing is a secret sharing method having such a property that data is divided into n random values (called shares), if k or more shares are collected, the original data can be restored, and information of the original data cannot be obtained from less than k shares. Specifically, the secure computation apparatus of the following example uses Shamir secret sharing (Reference NPL 1) or replicated secret sharing (Reference NPL 2 and NPL 3).

(Reference NPL 1: Adi Shamir. How to share a secret. Communications of the ACM, Vol. 22, No. 11, pp. 612-613, 1979.)

(Reference NPL 2: Mitsuru Ito, Akira Saito, and Takao Nishizeki. Secret sharing scheme realizing general access structure. Electronics and Communications in Japan (Part III: Fundamental Electronic Sciences), Vol. 72, No. 9, pp. 56-64, 1989.)

(Reference NPL 3: Ronald Cramer, Ivan Damgard, and Yuval Ishai. Share conversion, pseudorandom secret-sharing and applications to secure computation. In Theory of Cryptography Conference, pp. 342-362. Springer, 2005)

In this specification, a share of a value x by the Shamir secret sharing is represented as [[x]]. Note that (( ) is used instead of in [Claims]. A share of the value x by the replicated secret sharing is represented as {x}. Since the replicated secret sharing is particularly efficient for processing of 1-bit data, it will be properly used in the following example. Further, a value obtained by sharing substitution σ is represented as <σ>.

<Components>

<<Addition/Subtraction, Constant Multiplication>>

Addition/subtraction and constant multiplication of shares can be computed without requiring communication. The addition/subtraction and constant multiplication are described as follows.

[[x]]+[[y]], c[[x]]

<<Product-Sum Operation>>

The product-sum operation of $a^{\rightarrow}$ and $b^{\rightarrow}$ is written as follows.

[[c]]←Psum([[$a^{\rightarrow}$]], [[$b^{\rightarrow}$]])

<<Logical Operations>>

An OR operation is an operation having ciphertext {a} and {b} of 1-bit values a and b as inputs and outputting ciphertext of the result c of computation a OR b, and is described as follows.

{c}←Or({a}, {b})

Other logical operations such as an AND operation and an XOR operation are also described in the same manner.

<<Prefix/Suffix OR>>

PrefixOR is an operation for returning a bit column obtained by taking OR of all bits from the head to each position with respect to bit column $b^{\rightarrow}$. That is, when output is $c^{\rightarrow}$, $c_i^{\rightarrow}\leftarrow c_{i-1}^{\rightarrow}$OR$b_i^{\rightarrow}$, where $c_0^{\rightarrow}\leftarrow b_0^{\rightarrow}$. This is written as {$c^{\rightarrow}$}←PrefixOr ({$b^{\rightarrow}$}). SuffixOR is an operation for returning a bit column obtained by taking OR of all bits from the end of c- to each position.

<<Equality Determination>>

An equality determination operation is an operation having variance values [[a]], [[b]] of a and b as inputs, and outputting a variance value of a Boolean value c of a==b, and is described as follows.

{c}←Eq([[a]], [[b]])

<<Concealed Stable Sorting>>

Concealed stable sorting is a protocol for stably sorting vectors. The concealed stable sorting is composed of the following algorithm. <π>←GenPerm ([[$k^{\rightarrow}$]]): Substitution r for stably sorting key column is $k^{\rightarrow}$ in ascending order is output. [[$v'^{\rightarrow}$]]←Sort(<π>, [[$v^{\rightarrow}$]]): π is applied to $v^{\rightarrow}$ and rearranged [[$v'^{\rightarrow}$]] is output. As a high-speed mounting method for realizing this, Reference NPL 4 and the like are known.

(Reference NPL 4: Dai Ikarashi, Koki Hamada, Ryo Kikuchi, and Koji Chida, "Design and implementation of ultra-fast secure computation sorting: the day secure computation is on par with scripting languages," CSS 2017 papers, 2017(2), pp. 1-8, 2017-10-16)

In a case in which a set of a plurality of columns is used as a key column, it is written as follows. Here, it is assumed that a previously designated key is preferentially sorted.

<π>←GenPerm([[k$_1$→]], [[k$_2$→]])

<<Modulus Conversion>>

Processing of converting 1-bit {a} into [[a]] is described as follows.

[[a]]←ModConv({a})

Specifically, the method of Kikuchi et al., described in Reference NPL 5 is known.

(Reference NPL 5: Ryo Kikuchi, Dai Ikarashi, Takahiro Matsuda, Koki Hamada, and Koji Chida. Efficient bitdecomposition and modulus-conversion protocols with an honest majority. In Willy Susilo and Guomin Yang, editors, Information Security and Privacy, pp. 64-82, Cham, 2018. Springer International Publishing.)

<<Common Processing>>

Common processing is processing for returning a flag column in which a group head element becomes 1, a data column rearranged for each group, and a key column when a key column and a data column are given and grouped with the same value of the key column as an output. Specifically, this can be realized by the method of Kikuchi et al. (NPL 1). Details of the method of Kikuchi et al. (NPL 1) are shown in Algorithm 1 since it is closely related to the method which will be disclosed in the following examples.

[Algorithm 1: GroupByCommon]

```
Input: key column [[k→]], data column [[v→]]], (where [[k→]] is
the number of rows 1, and [[v→]] is the number of rows 1)
Output: grouped key column [[k'→]], grouped data column
[[v'→]], group flag column {g→} (where [[k'→]] is the number of
rows 1, [[v'→]] is the number of rows 1, and {g→} is a vector
having a length 1 which is 1 only at the head position of a
group and 0 in other cases)
1: <σ>←GenPerm([[k→]], [[v]→]])
2: [[k'→]]←Sort([[k→]], <σ>)
3: [[v'→]]←Sort([[v→]], <σ>)
4: {eq→}_0←{0}; {g→}_0←{1}
5: for 1≤i<1 do in parallel
6: {eq→}_i←Eq([[k→]]_i-1, [[k→]]_i)
7: {g→}_i←Not({eq→}_i)
8: end for
9: return [[k'→]], [[v'→]], {g→}
[Algorithm 1 end]
```

The first line of Algorithm 1 indicates processing of outputting a substitution a for concealing and stably sorting a key column k→ and a data column v→ in ascending order according to GenPerm.

The second line indicates processing of concealing and stably sorting the key column [k→] by σ, and outputting the sorted result [[k'→]].

The third line indicates processing of concealing and stably sorting the data column [[v→]] by a and outputting the sorted result [[v'→]].

The fourth line indicates processing of setting the value {eq→}$_0$ of the head of a vector {eq→} to {0}, and setting the value {g→}$_0$ of the head of a group flag column {g→} to {1}.

The fifth line indicates that processing of the sixth and seventh lines is repeatedly executed.

The sixth line indicates that the i-th value {eq→}$_i$ of the vector {eq→} is set to Eq ([[k→]]$_{i-1}$, [[k→]]$_i$) that is, 1 if the (i−1)-th value [[k→]]$_{i-1}$ of the key column is equal to the i-th value [[k→]]$_i$ and 0 if not. Therefore, the vector eq→ is a vector characterized in that 1 continues until approaching a change point of the value of a key column, 0 appears at the position where the value of the key column changes, and 1 continues until a change point of the value of the next key column.

The seventh line indicates a vector in which the i-th value {g→}$_i$ of the group flag column {g→} is set to Not ({eq→}$_i$), that is, the value of the group flag column g→ is 1 at a position where the value of the key column changes, and the value is 0 at other positions.

The eighth line indicates the end of repetitive processing, and the ninth line represents the grouped key column [[k'→]], the grouped data column [[v'→]], and the group flag column {g→}, which are outputs of Algorithm 1.

Hereinafter, details of a method of generating a window frame flag column for executing the window function on secure computation, which is a unique method of the present invention, is shown in Algorithm 2.

[Algorithm 2: GenWindowFrame]

```
frame start position s, and window frame end position t (where
s≤i≤st)
Output: window frame flag column {w→}
1: {w^f→}←SuffixOr(subVector({g→},s+1,i))
2: {w^l→}←PrefixOr(subVector({g→},i+1,t))
3: {w→}←{w^f→}|{0}|{w^l→}
4: return {w→}
[Algorithm 2 end]
```

The first line of Algorithm 2 indicates that a bit column obtained by SuffixOR, that is, an OR operation performed on all bits from the end to each position, is generated as a former half window frame flag column {w$^f$→} with respect to a vector subVector ({g→}, s+1, i) obtained by extracting elements from the ((s+1)-th) element one element ahead of the window frame start position of {g→} to the i-th element. Therefore, in a case where a position where the value of a key column changes appears on the way from the end to the head, all elements positioned at the head from this position are 1, and thus results of 1, . . . , 1, 0, . . . , 0 are obtained.

The second line indicates that a bit column obtained by PrefixOR, that is, an OR operation performed on all bits from the head to each position, is generated as a latter half window frame flag column {w$^l$→} with respect to a vector subVector ({g→}, i+1, t) obtained by extracting elements from the (i+1)-th to the window frame end position (t-th) of {g→}. Therefore, in a case where a position where the value of a key column changes appears on the way from the head to the end, all elements positioned at the end from this position are 1, and thus results of 0, . . . , 0, 1, . . . , 1 are obtained.

The third and fourth lines indicate that {w$^f$→} is combined from the front side and {w'→} is combined from the rear side with {0} interposed therebetween to generate {w→} and output it. That is, {0} corresponds to a position corresponding to the current row number. Vector w→ indicates the value 0 for elements belonging to a group including the current row number and the value 1 for elements belonging to a group different from the group including the current row number. For example, when elements corresponding to the current row number are represented by sandwiching with > <, an output example such as 1, . . . , 1, 0, . . . , >0<, . . . , 0, 1, . . . , 1 can be obtained as vector w→.

Details of a method of computing a Sum operation for the window function are shown in the following Algorithm 3.

[Algorithm 3: WindowSum]

```
Input: key column [[k→]], data column [[v→]], window frame
start position offset poffset, and window frame end position
```

-continued

[Algorithm 3: WindowSum]

offset foffset (where [[k→]] is the number 1 of rows and [[v→]] is the number 1 of rows)
Output: grouped key column [[k'→]], totaling result column [[u→]] (where [[k'→]] is the number 1 of row and [[u→]] is the number 1 of rows)
1: [[k'→]], [[v'→]], {g→}←GroupByCommon([[k→]], [[v→]])
2: for 0≤i<1 do in parallel
3 : s←max(i-poffset, 0)
4: t←min(i+foffset, 1-1)
5: {w→}←GenWindowFrame({g→}, i, s, t)
6: {w'→}←Not({w}→)
7: [[w'→]]←ModConv({w'→})
8: [[u'→]]$_i$←PSum([[w'→]], subVector([[v'→]], s, t))
9: end for
10: return [[k'→]], [[u'→]]
[Algorithm 3 end]

The first line of Algorithm 3 indicates processing of generating a grouped key column [[k'→]], a grouped data column [[v'→]], and a group flag column {g→} according to Algorithm 1.

The second line indicates that processing up to the ninth line is repeatedly executed.

The third line indicates processing of setting i-poffset, that is, a position offset from the current row number i by the window frame start position offset poffset, as a window frame start position s, and computing the window frame start position s as s-max(i-poffset, 0) in order to process all exceptions where i-poffset is equal to or less than 0 as 0.

The fourth line indicates processing of setting i+foffset, that is, a position offset from the current row number i by the window frame end position offset foffset, as a window frame end position t, and computing the window frame end position t as t←min(i+foffset, 1−1) in order to process all exceptions where i+foffset is equal to or greater than 1−1 as 1−1.

The fifth line indicates processing of computing the window frame flag column {w→} by Algorithm 2.

The sixth line indicates processing of generating an inverted window frame flag column {w'→} by performing a NOT operation on the window frame flag column {w→}. The seventh line indicates processing of converting {w'→}, which was a share of the replicated secret sharing, into a share [[w'→]] of the Shamir secret sharing. The seventh line is performed to execute PSum processing in the subsequent eighth line.

The eighth line indicates execution of PSum performed on a subVector ([[v'→], s, t) obtained by extracting elements from the window frame starting position s to the window frame end position t of the data column [[v'→]] sorted in ascending order and [[w'→]]. Accordingly, since only the position of a totaling target remains as a product and all the other products become 0, the totaling result column [[u→]] indicates the result of the Sum operation performed on the totaling target. The ninth line indicates end of repetitive processing, and the tenth line indicates processing of outputting the grouped key column [[k'→]] and the totaling result column [[u→]].

By executing GroupByCommon in the first line, data columns are sorted in ascending order in the group.

First, {w→} which is a flag column in which a position that is a totaling target is 0 and a position that is not a totaling target is 1 in the fifth line is generated. Although {g→} is a flag column in which the element at the end of the group is indicated by 1 in NPL 1, if it is regarded as a flag associated with the boundary of the group, it can be regarded as a bit column in which the group boundary is indicated by 1. Then, as shown in Algorithm 2, a flag column in which elements beyond the group boundary become 1 by performing Suffix/Prefix OR in the vertical direction can be generated. However, the initial value of the current row is set to 0 in order to always set the current row to a totaling target.

As described above, {w→} is a flag column in which a position which is a totaling target is 0 and a position which is not a totaling target is 1. In order to calculate Sum in a window frame, it is sufficient to sum up the elements of v'→ corresponding to positions where w→ is 0.

Accordingly, in the sixth line, a Not operation is executed on the flag column {w→}, and a flag column {w'→} in which a position which is a totaling target is 1 and all the other positions become 0 is computed.

Although computation can be performed using a method of applying If Then (which requires multiplication) to the vector [[v'→]] in order and adding all elements, not only computation cost but also the communication quantity can be reduced by using PSum instead.

In SQL, there are "UNBOUNDED PRECEDINGS" indicating that a window frame start position starts from the beginning in a group as an option for designating a window frame start position, and there are "UNBOUNDED PRECEDINGS" indicating that a window frame end position is up to the end in the group as an option for designating a window frame end position. Since a group flag is not a public value, poffset and foffset cannot be designated at the beginning/end in the group, but the same result can be obtained by setting the window frame start position offset to poffset=—n in the case of "UNBOUNDED PRECEDINGS" and setting the window frame end position offset foffset-n in the case of "UNBOUNDED FOLLOWING." In the case of designating "CURRENT ROW" indicating the current row as an option for designating a start/end position, the window frame start position/end position offset are set to 0.

Example 1

A configuration of a secure computation apparatus of example 1 for executing the Sum operation for the window function by executing Algorithm 3 will be described below with reference to FIG. 1. As shown in the figure, the secure computation apparatus 1 of the present example includes an input data storage unit 10A, a former half window frame flag column generation unit 10, a latter half window frame flag column generation unit 11, a window frame flag column generation unit 12, an inverted window frame flag column generation unit 13, a share conversion unit 14, a product-sum operation unit 15, and an output data storage unit 10B.

<Input Data Storage Unit 10A>

The input data storage unit 10A stores data input to the secure computation apparatus in advance. In the present example, on the assumption that Algorithm 1 has already been executed, the input data storage unit 10A stores a grouped key column [[k'→]], a grouped data column [[v'→]], and a group flag column {g→}. Further, the input data storage unit 10A stores in advance a window frame start position offset poffset and a window frame end position offset foffset which are parameters arbitrarily set by a user.

In a case where Algorithm 1 is also executed in the secure computation apparatus, it is sufficient for the input data storage unit 10A to store a key column [[k→]], a data column [[v→]], the window frame start position offset poffset, and the window frame end position offset foffset in advance.

Figure 2:
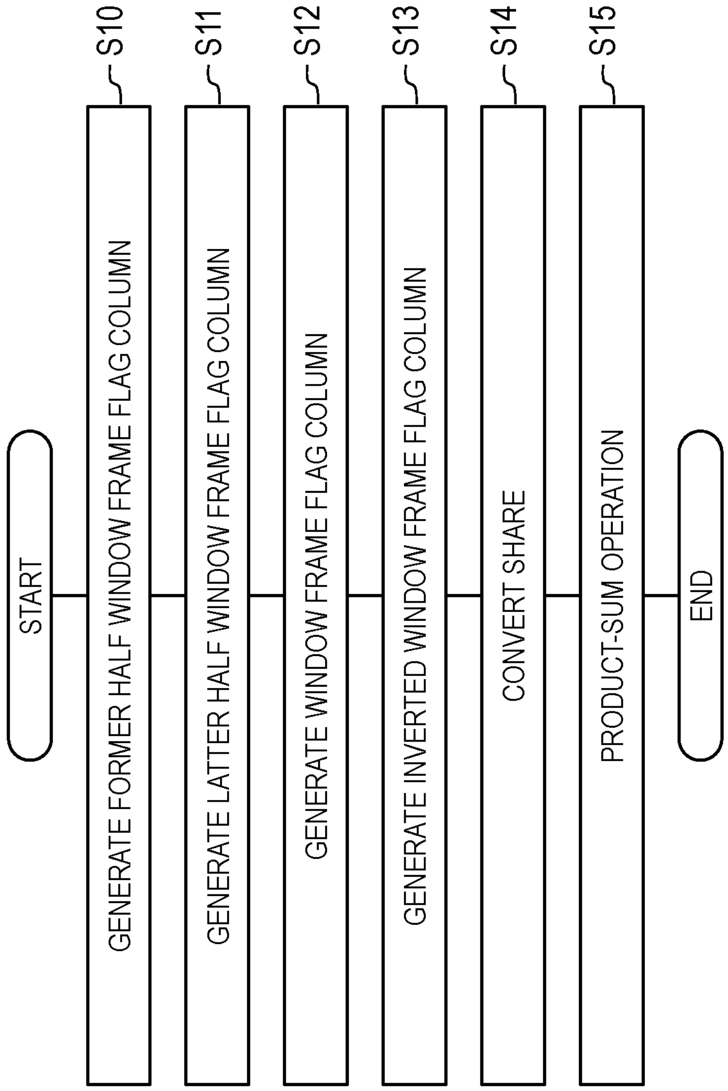
FIG. 2 is a flowchart illustrating an operation of the secure computation apparatus of example 1.

Detailed operations of the components will be described below with reference to FIG. 2.

<Former Half Window Frame Flag Column Generation Unit 10>

The former half window frame flag column generation unit 10 executes the third to fifth lines of Algorithm 3 (the first line of Algorithm 2 which is a reference destination of the fifth line) according to the repetition condition of the second line of the Algorithm 3.

Specifically, the former half window frame flag column generation unit 10 acquires a window frame start position s and a window frame end position t, and generates, with respect to a vector subVector ($\{g^{\rightarrow}\}$, s+1, i) obtained by extracting elements from the (s+1)-th element to the i-th element of $\{g^{\rightarrow}\}$, a bit column obtained by an OR operation performed on all bits from the end to each position as a former half window frame flag column $\{w^{f\rightarrow}\}$ (S10).

<Latter Half Window Frame Flag Column Generation Unit 11>

The latter half window frame flag column generation unit 11 executes the third to fifth lines of Algorithm 3 (the second line of Algorithm 2 which is a reference destination of the fifth line) according to the repetition condition of the second line of Algorithm 3.

Specifically, the latter half window frame flag column generation unit 11 acquires a window frame start position s and a window frame end position t, and generates, with respect to a vector subVector ($\{g^{\rightarrow}\}$, i+1, t) obtained by extracting elements from the (i+1)-th element to the t-th element of $\{g^{\rightarrow}\}$, a bit column obtained by an OR operation performed on all bits from the head to each position as a latter half window frame flag column $\{w'^{\rightarrow}\}$ (S11).

<Window Frame Flag Column Generation Unit 12>

The window frame flag column generation unit 12 executes the fifth line of Algorithm 3 (the third line of Algorithm 2 which is a reference destination of the fifth line) according to the repetition condition of the second line of Algorithm 3.

Specifically, the window frame flag column generation unit 12 generates a window frame flag column $\{w^{\rightarrow}\}$ by combining the former half window frame flag column $\{w^{f\rightarrow}\}$ from the front side and the latter half window frame flag column $\{w'^{l\rightarrow}\}$ from the rear side having {0} interposed therebetween (S12).

<Inverted Window Frame Flag Column Generation Unit 13>

The inverted window frame flag column generation unit 13 executes the sixth line of Algorithm 3 according to the repetition condition of the second line of Algorithm 3.

Specifically, the inverted window frame flag column generation unit 13 generates an inverted window frame flag column $\{w'^{\rightarrow}\}$ by performing a NOT operation on the window frame flag column $\{w^{\rightarrow}\}$(S13).

<Share Conversion Unit 14>

The share conversion unit 14 executes the seventh line of Algorithm 3 according to the repetition condition of the second line of Algorithm 3.

Specifically, the share conversion unit 14 converts the inverted window frame flag column $\{w'^{\rightarrow}\}$ into an inverted window frame flag column $[[w'^{\rightarrow}]]$(S14).

<Product-Sum Operation Unit 15>

The product-sum operation unit 15 executes the eighth line of Algorithm 3 according to the repetition condition of the second line of Algorithm 3.

Specifically, the product-sum operation unit 15 executes a product-sum operation on a subVector ($[[v'^{\rightarrow}]]$, s, t) obtained by extracting elements from s to t of the data column $[[v'^{\rightarrow}]]$ obtained by sorting the data column $[[v^{\rightarrow}]]$ in ascending order and the inverted window frame flag column $[[w'^{\rightarrow}]]$ (S15).

<Output Data Storage Unit 10B>

The output data storage unit 10B stores $[[k'^{\rightarrow}]]$ and $[[u^{\rightarrow}]]$ which are outputs of Algorithm 3.

Modified Example

Figure 3:
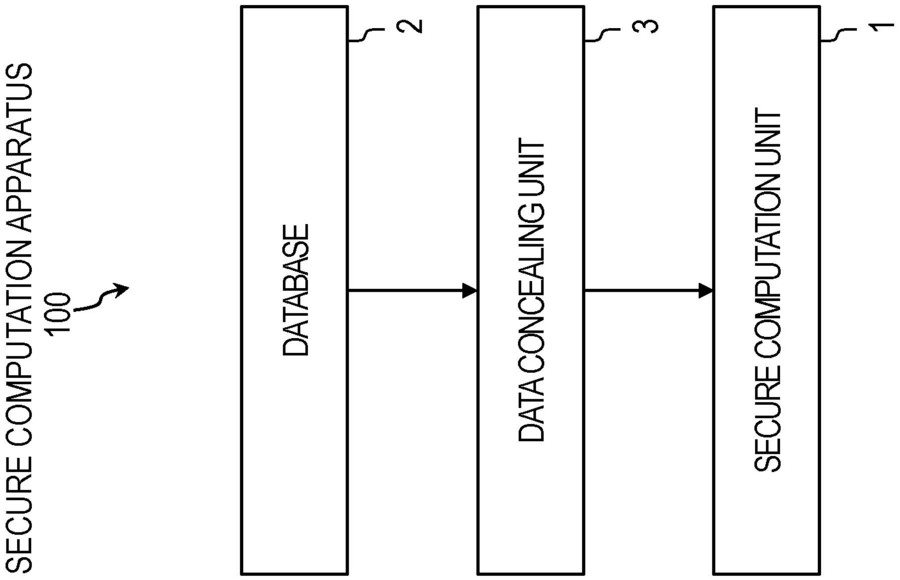
FIG. 3 is a block diagram illustrating a functional configuration of a secure computation apparatus according to modified example 1.
Figure 4:
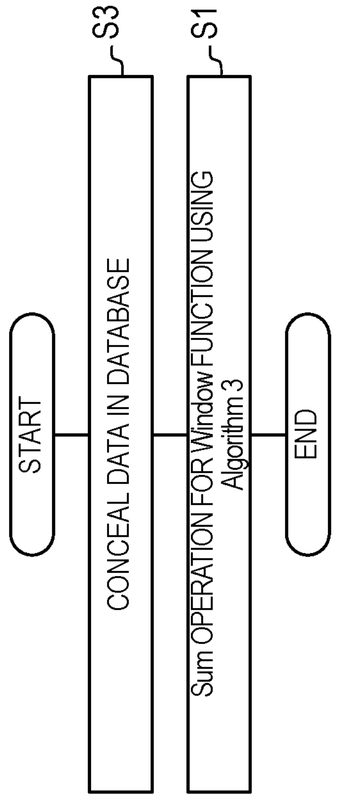
FIG. 4 is a flowchart illustrating an operation of the secure computation apparatus of modified example 1.

As shown in FIGS. 3 and 4, a secure computation apparatus may include a database 2 composed of data before concealment, a data concealing unit 3 for concealing the data in the database 2, and a secure computation unit 1 for executing the same processing as that of the secure computation apparatus 1 (a secure computation apparatus 100 of modified example 1, steps S3 and S1).

Additional Note

The device of the present invention includes, for example, as single hardware entity, an input unit to which a keyboard or the like can be connected, an output unit to which a liquid crystal display or the like can be connected, a communication unit to which a communication device (for example, a communication cable) capable of communication with the outside of the hardware entity can be connected, a Central Processing Unit (CPU, which may include a cache memory, a register, and the like), a RAM or a ROM that is a memory, an external storage device that is a hard disk, and a bus for connecting the input unit, the output unit, the communication unit, the CPU, the RAM, the ROM, and the external storage device so as to allow data communication therebetween. Also, if necessary, the hardware entity may be provided with a device (drive) or the like capable of reading and writing data from/to a recording medium such as a CD-ROM. Examples of a physical entity including such hardware resources include a general-purpose computer.

Programs required to implement the above-described functions, data required to process the program, and the like are stored in the external storage device of the hardware entity (the storage device is not limited to the external storage device and, for example, the program may be stored in the ROM which is a read-only storage device). In addition, data or the like obtained by processing of these programs is appropriately stored in the RAM, the external storage device, or the like.

In the hardware entity, each program stored in the external storage device (or a ROM or the like) and data necessary for processing of each program are read to the memory as necessary, and interpreted, executed, and processed by the CPU as appropriate. As a result, the CPU realizes the prescribed functions (the respective constituting elements expressed as * unit, * means, or the like in the above description).

The present invention is not limited to the above-described example, and appropriate changes can be made without departing from the spirit of the present invention. Further, the processes described in the examples are not only executed in time series in the described order, but also may be executed in parallel or individually according to a processing capability of a device that executes the processes or as necessary.

As described above, when the processing function in the hardware entity (the device according to the present invention) described in the above-described examples is implemented by the computer, processing content of the function included in the hardware entity is written by the program.

Then, by executing this program on the computer, the processing function in the above-described hardware entity is implemented on the computer.

Figure 5:
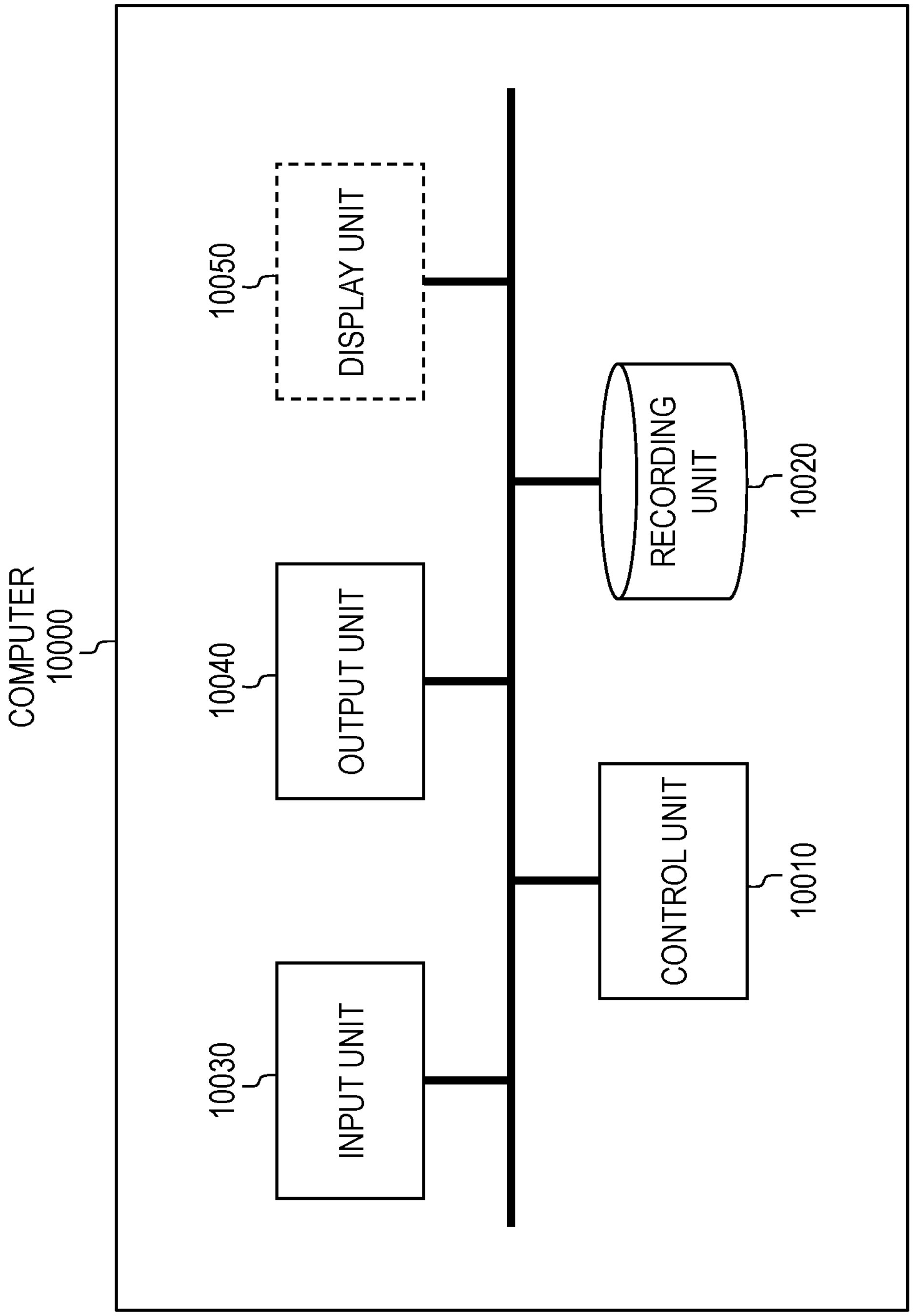
FIG. 5 is a diagram illustrating an example of a functional configuration of a computer.

The above-described various types of processing can be performed by reading a program executing each step of the foregoing methods to a storage unit 10020 of a computer 10000 illustrated in FIG. 5 and operating a control unit 10010, an input unit 10030, an output unit 10040, or the like.

A program describing this processing content can be recorded on a computer-readable recording medium. An example of the computer-readable recording medium may include any recording medium such as a magnetic recording device, an optical disc, a magneto-optical recording medium, and a semiconductor memory. Specifically, for example, a hard disk device, a flexible disk, magnetic tape, or the like can be used as the magnetic recording device, a Digital Versatile Disc (DVD), a DVD-Random Access Memory (DVD-RAM), a Compact Disc Read Only Memory (CD-ROM), a CD-Recordable/Rewritable (CD-R/R), or the like can be used as the optical disk, a Magneto-Optical disc (MO) or the like can be used as the magneto-optical recording medium, and an Electrically Erasable and Programmable-Read Only Memory (EEP-ROM) or the like can be used as the semiconductor memory.

The program is distributed, for example, by sales, transfer, or lending of a portable recording medium such as a DVD or a CD-ROM on which the program is recorded. In addition, the distribution of the program may be performed by storing the program in advance in a storage device of a server computer and transferring the program from the server computer to another computer via a network.

The computer that executes such a program first temporarily stores, for example, the program recorded on the portable recording medium or the program transferred from the server computer in a storage device of the computer. Furthermore, when processing is performed, the computer reads the program stored in the own recording medium and performs the processing in accordance with the read program. In addition, as another execution mode of the program, a computer may directly read the program from a portable recording medium and execute processing in accordance with the program. Further, whenever the program is transmitted from the server computer to the computer, the processing may be performed in order in accordance with the received program. Instead of transferring the program from the server computer to the computer, the above-described processing may be executed by a so-called application service provider (ASP) type service, in which a processing function is implemented in response to an execution command and in accordance with result acquisition alone. The program in this example includes information to be provided for processing by a computer and information equivalent to the program (data which is not a direct command to the computer but has a property that defines the processing of the computer and the like).

Further, although the hardware entity is configured by a predetermined program being executed on the computer in the present example, at least a part of the processing content of the hardware entity may be realized in hardware.

The invention claimed is:

1. A secure computation apparatus for performing arithmetic operations while keeping a database including a key column $\vec{k}$ which is an attribute column and a data column $\vec{v}$ which is a value column concealed, wherein a group flag column $\vec{g}$ represents a vector in which a value becomes 1 at a position where a value of the key column changes, and a value becomes 0 at other positions, a share of a value x according to replicated secret sharing is represented as {x}, a share of the value x according to Shamir secret sharing is represented as ((x)), a current row number is represented by i, a window frame start position is represented by s, and a window frame end position is represented by t, the number of rows of the key column and the data column is set to 1, and the current row number i is incremented by one each time all flag column generation processing ends in a range of 0 or more and less than 1, the secure computation apparatus comprising:

processing circuitry configured to generate, with respect to a vector subVector $(\{\vec{g}\}$, s+1, i) obtained by extracting elements from an (s+1)-th element to an i-th element of $\{\vec{g}\}$, a bit column obtained by an OR operation performed on all bits from the i-th element of the vector sub Vector $(\{\vec{g}\}$, s+1, i) to each position as a first half window frame flag column $\{\overrightarrow{w^f}\}$;

generate, with respect to a vector subVector $(\{\vec{g}\}$, i+1, t) obtained by extracting elements from an (i+1)-th element to a t-th element of $\{\vec{g}\}$, a bit column obtained by an OR operation performed on all bits from i+1th element of the vector sub Vector $(\{\vec{g}\}$, i+1, i) to each position as a second half window frame flag column $\{\overrightarrow{w^l}\}$;

generate a window frame flag column $\{\vec{w}\}$ by combining the first half window frame flag column $\{\overrightarrow{w^f}\}$ from the front side and the second half window frame flag column $\{\overrightarrow{w^l}\}$ from the rear side having {0} interposed between the first half window frame flag column $\{\overrightarrow{w^f}\}$ and the second half window frame flag column $\{\overrightarrow{w^l}\}$;

generate an inverted window frame flag column $\{\overrightarrow{w'}\}$ by performing a NOT operation on the window frame flag column $\{\vec{w}\}$;

convert the inverted window frame flag column $\{\overrightarrow{w'}\}$ into an inverted window frame flag column $((\overrightarrow{w'}))$; and execute a product-sum operation on subVector $((\overrightarrow{v'}))$, s, t) obtained by extracting elements from s to t of a data column $((\overrightarrow{v'}))$ obtained by sorting a data column $((\vec{v}))$ in ascending order and the inverted window frame flag column $(\overrightarrow{w'})$.

2. A secure computation method for performing arithmetic operations while keeping a database including a key column $\vec{k}$ which is an attribute column and a data column $\vec{v}$ which is a value column concealed, wherein a group flag column $\vec{g}$ represents a vector in which a value becomes 1 at a position where a value of the key column changes, and a value becomes 0 at other positions, a share of a value x according to replicated secret sharing is represented as {x}, a share of the value x according to Shamir secret sharing is represented as ((x)), a current row number is represented by i, a window frame start position is represented by s, and a window frame end position is represented by t, the number of rows of the key column and the data column is set to 1, and the current row number i is incremented by one each time all flag column generation processing ends in a range of 0 or more and less than 1, the secure computation method comprising:

generating, with respect to a vector subVector $(\{g^{\rightarrow}\}, s+1, i\}$ obtained by extracting elements from an (s+1)-th element to an i-th element of $\{g^{\rightarrow}\}$, a bit column obtained by an OR operation performed on all bits from the i-th element of the vector sub Vector $(\{^{\rightarrow}\}, s+1, i)$ to each position as a first half window frame flag column $\{w^{f\rightarrow}\}$;

generating, with respect to a vector subVector $(\{g^{\rightarrow}\}, i+1, t\})$ obtained by extracting elements from an (i+1)-th element to a t-th element of $\{g^{\rightarrow}\}$, a bit column obtained by an OR operation performed on all bits from i+1th element of the vector subVector $(\{g^{\rightarrow}\}, t+1, i)$ to each position as a second half window frame flag column $\{w^{l\rightarrow}\}$;

generating a window frame flag column $\{w^{\rightarrow}\}$ by combining the first half window frame flag column $\{w^{f\rightarrow}\}$ from the front side and the second half window frame flag column $\{w^{l\rightarrow}\}$ from the rear side having $\{0\}$ interposed between the first half window frame flag column $\{w^{f\rightarrow}\}$ and the second half window frame flag column $\{w^{l\rightarrow}\}$;

generating an inverted window frame flag column $\{w'^{\rightarrow}\}$ by performing a NOT operation on the window frame flag column $\{w^{\rightarrow}\}$;

converting the inverted window frame flag column $\{w'^{\rightarrow}\}$ into an inverted window frame flag column $((w'^{\rightarrow}))$; and executing a product-sum operation on sub Vector $((v'^{\rightarrow}, s, t)$ obtained by extracting elements from s to t of a data column $((v'^{\rightarrow}))$ obtained by sorting a data column $((v^{\rightarrow}))$ in ascending order and the inverted window frame flag column $(([w'^{\rightarrow}]))$.

3. A computer-readable non-transitory recording medium storing a computer-executable program instructions that when executed by a processor cause a computer to function as the secure computation apparatus for performing arithmetic operations while keeping a database including a key column $k^{\rightarrow}$ which is an attribute column and a data column $v^{\rightarrow}$ which is a value column concealed, wherein a group flag column $g^{\rightarrow}$ represents a vector in which a value becomes 1 at a position where a value of the key column changes, and a value becomes 0 at other positions, a share of a value x according to replicated secret sharing is represented as $\{x\}$, a share of the value x according to Shamir secret sharing is represented as ((x)), a current row number is represented by i, a window frame start position is represented by s, and a window frame end position is represented by t, the number of rows of the key column and the data column is set to 1, and the current row number i is incremented by one each time all flag column generation processing ends in a range of 0 or more and less than 1, the secure computation apparatus comprising:

processing circuitry configured to generate, with respect to a vector subVector $(\{g^{\rightarrow}\}, s+1, i)$ obtained by extracting elements from an (s+1)-th element to an i-th element of $\{g^{\rightarrow}\}$, a bit column obtained by an OR operation performed on all bits from the i-th element of the vector subVector $(\{g^{\rightarrow}\}, s+1, i)$ to each position as a first half window frame flag column $\{w^{f\rightarrow}\}$;

generate, with respect to a vector sub Vector $(\{g^{\rightarrow}\}, i+1, t)$ obtained by extracting elements from an (i+1)-th element to a t-th element of $\{g^{\rightarrow}\}$, a bit column obtained by an OR operation performed on all bits from i+1th element of the vector subVector $(\{g^{\rightarrow}\}, t+1, i)$ to each position as a second half window frame flag column $\{w^{l\rightarrow}\}$;

generate a window frame flag column $\{w^{\rightarrow}\}$ by combining the first half window, frame flag column $\{w^{f\rightarrow}\}$ from a front side and the second half window frame flag column $\{w^{l\rightarrow}\}$ from a rear side having $\{0\}$ interposed between the first half window frame flag column $\{w^{f\rightarrow}\}$ and the second half window frame flag column $\{w^{l\rightarrow};$ generate an inverted window frame flag column $\{w'^{\rightarrow}\}$ by performing a NOT operation on the window frame flag column $\{w^{\rightarrow}\}$;

convert the inverted window frame flag column $\{w'^{\rightarrow}\}$ into an inverted window frame flag column $((w'^{\rightarrow}))$; and execute a product-sum operation on sub Vector $((v'^{\rightarrow})), s, t)$ obtained by extracting elements from s to t of a data column $((v'^{\rightarrow}))$ obtained by sorting a data column $((v^{\rightarrow}))$ in ascending order and the inverted window frame flag column $((w'^{\rightarrow}))$.

* * * * *